United States Patent [19]
Sullivan et al.

[11] Patent Number: 5,886,078
[45] Date of Patent: Mar. 23, 1999

[54] POLYMERIC COMPOSITIONS AND METHODS FOR MAKING CONSTRUCTION MATERIALS FROM THEM

[75] Inventors: Henry W. Sullivan, Houston, Tex.; Wolfgang A. Mack, St. Bartholomy, Guadeloupe

[73] Assignee: Tietek, Inc., Bellaire, Tex.

[21] Appl. No.: 696,147

[22] Filed: Aug. 13, 1996

[51] Int. Cl.$^6$ .................. C08K 3/34; C08J 9/00
[52] U.S. Cl. ................. 524/449; 521/79; 521/91; 428/318.8
[58] Field of Search .................. 521/79, 81; 524/449; 428/318.8

[56] References Cited

U.S. PATENT DOCUMENTS

| | | | |
|---|---|---|---|
| 3,863,329 | 2/1975 | Bartlett | 238/84 |
| 4,152,185 | 5/1979 | Tessenske | 156/94 |
| 4,172,872 | 10/1979 | Nagai | 264/519 |
| 4,231,908 | 11/1980 | Pennino | 260/28.5 |
| 4,616,055 | 10/1986 | Mason | 524/381 |
| 4,925,094 | 5/1990 | Buekett | 238/265 |
| 5,030,662 | 7/1991 | Banerjie | 521/43.5 |
| 5,055,350 | 10/1991 | Neefe | 428/331 |
| 5,212,223 | 5/1993 | Mack et al. | 524/318 |
| 5,238,734 | 8/1993 | Murray | 428/292 |
| 5,258,222 | 11/1993 | Crivelli | 428/323 |
| 5,308,908 | 5/1994 | Fukui et al. | 524/451 |
| 5,417,904 | 5/1995 | Razi et al. | 264/129 |
| 5,468,539 | 11/1995 | Crivelli | 428/141 |

FOREIGN PATENT DOCUMENTS 1 586 882  3/1981  United Kingdom .............. C08J 9/24

OTHER PUBLICATIONS

Dialog Abstract of JP 58–017139, Fukushima Nobuo et al., published Feb. 1, 1983.
Dialog Abstract of JP 57–207630, Yamamoto Noboru et al., published Dec. 20, 1982.

Primary Examiner—Christopher Raimund
Attorney, Agent, or Firm—Arnold White & Durkee

[57] ABSTRACT

Polymeric composites are described that can be formed into articles of construction to replace similar articles formed of wood and concrete. The composites comprise a polymer component comprising polyolefins preferably obtained as waste or recycle; a rubbery polymeric component preferably obtained from disposed tires; and a reinforcing filler component comprising mica. The mica is preferably of the expanded variety to allow for a reduction in density over similar composites containing traditional mica. The evaporation of volatile compounds initially contained within the different components, primarily the rubbery polymeric component, allows for the production of articles of construction having a foamed inner core in which the foamed cell structure has not been achieved through the use of traditional $CO_2$ generating foaming agents. Processes for forming the articles of construction are provided that include both extrusion and molding techniques.

19 Claims, 2 Drawing Sheets

5,886,078

POLYMERIC COMPOSITIONS AND METHODS FOR MAKING CONSTRUCTION MATERIALS FROM THEM

BACKGROUND OF THE INVENTION

1. Field of the Invention

The invention relates in general to the field of polymeric composites that can be used as construction materials. Specifically, the invention relates to polymeric composites having a polymeric component that is preferably olefin and preferably recycled, a rubbery polymeric component, and a reinforcing filler component containing mica.

2. Description of the Related Art

The use of polymeric materials in commerce has increased steadily since the introduction of some of the first synthetic polymers such as Bakelite. On a volume basis, polyolefins, including notably polyethylene and polypropylene, are one of the most widely produced families of polymers. Their use pervades numerous industries, including both thin and thick walled packaging, containers, toys, wire and cable jacketing, automotive parts, and medical supplies.

One of the benefits of the use of plastic or polymeric materials is the unique combination of light weight and strength available with them. The chemical, electrical, physical, and other properties of polymeric materials can be somewhat modified to meet the performance criteria for different products. Another benefit to plastic materials is their ease of manufacture by both molding and extrusion processes.

Polymeric materials are additionally not readily biodegradable. Because of this, consumer and industrial articles formed from polymers can have a much longer effective lifespan than comparable natural materials. A majority of polymeric material will often contain various stabilizers including both antioxidants and UV stabilizers to further extend their useful life. This long lifespan is however also one of the more negative aspects incumbent with the use of polymers. The fact that a very large proportion of polymers and in particular polyolefins are used in disposable or short-lived applications necessitates that a considerable amount of waste polymer is generated shortly after it is produced. Until recently a very large proportion of this waste plastic found its way into landfills. The use of these waste plastics as a recycled component in products has recently led to marginal reductions in the amount of waste plastic; however, the waste material used in this manner is often incorporated into articles which themselves have a relatively short lifespan. A more effective long term solution to the growing volume of waste polymer, particularly polyolefins, would be to utilize the waste plastic as a component in construction materials that require a relatively long lifespan. Exemplary long use construction materials would include railroad ties, parking curbs, marine pilings, decking or other structures in docks, and numerous others. When polymers are used for these purposes, they are typically combined with various other ingredients, such as reinforcing fillers. Polymeric compositions containing a reinforcing filler and which may contain other components are commonly referred to as composites.

These composite materials can be particularly beneficial when they are used to replace wood. For example wood based railroad ties are particularly susceptible to wear and deterioration due to processes such as erosion. In environments in which the railroad tie is subjected to numerous cycles from freezing to non-freezing conditions, the tie will crack as water which has penetrated the tie freezes and expands. Additionally wooden ties are subject to insect attack when creosote treatment is not optimal or when the creosote leaches out of the tie. Conversely, comparable materials formed of polymer containing composites are not as susceptible to water penetration. Additionally, the composite can more effectively distribute the stress resulting from that water that does penetrate, freeze, and expand. The ability to distribute the stress results in less cracking and warpage. The composite railroad ties are also not susceptible to insect attack.

The waste polyolefins which are typically utilized in these construction materials or other rigid structural members may contain high density polyethylene (HDPE), low density polyethylene (LDPE), linear low density polyethylene (LLDPE), other polyethylenes, polypropylene including both homopolymer and copolymer variations (e.g., propylene-ethylene copolymers), and combinations of these polymers. Unlike virgin polymers, these waste polymers have been subjected to at least one heat processing step and often usually have been exposed to environmental conditions, often for extended periods of time. Because of this, these waste polymers have very different properties than their virgin counterparts. The waste polymers will typically have lower flexural and tensile strength and lower thermal stability than virgin materials.

The waste polyolefin component of construction materials may often additionally contain minor amounts, typically less than about 20%, of various other polymers including polyvinyl chloride (PVC); chlorinated polyethylene (CPE); chloro-sulfonated polyethylene; various compounded polymers; polystyrene; and various engineering thermoplastics such as polyamides, polycarbonates, thermoplastic polyesters, and ABS.

Construction materials (or articles) formed of composites containing these waste polymers will typically contain a rubbery, typically polymeric, material to add impact strength and flexibility to the construction article. Any number of polymeric materials may be utilized for this rubbery component, including natural rubber, EPDM, styrene butadiene rubber, and styrene butadiene styrene rubber. However, in keeping with the goal of reducing the volume of waste deposited in landfills, a convenient source of the rubbery component is tires. Tires typically contain rubber; steel; and polyester or other strands or fibers. Various machines known in the art can be utilized to cut, grind or shred tires into tiny fragments that can then be utilized in processes which can form the desired composite material.

Another component that is typically found in these composite articles is a foaming agent which is used to control the density of the composite article. A typical foaming agent system will contain a Group I metal (alkali) bicarbonate and a bicarbonate salt of a saturated fatty acid. Alkali metal salts employed include sodium and potassium bicarbonate, while suitable saturated fatty acids include those having from 14 to 22 carbon atoms. The two compounds react together releasing $CO_2$ which forms voids in the solidified composite. The voids reduce the density of the final composite article, thus reducing the amount of raw materials required for a given volume of article, while at the same time increasing the strength to weight ratio of the composite article. The use of these foaming agents can however dramatically increase the cost of the composites. Additionally, because these foaming agents are utilized in such small amounts, typically less than about 2.0% of the total composite mass, a homogeneous distribution of the foaming agent is difficult to achieve. As a result, a uniform distribution of the voids within the composite article is difficult to achieve. The non-uniform distribution of voids results in a non-uniform distribution of weight within the article and non-uniform physical properties.

Finally, the addition to the composite of a reinforcing filler, depending upon its morphology and other properties, may enhance the tensile strength, impact strength, stiffness, and heat distortion properties of the composite. The reinforcing fillers are often used in conjunction with coupling agents, such as silanes and titanates, to effectuate the incorporation of the filler into the polymer matrix. Reinforcing fillers that have been used for these purposes in various composite structures include fiberglass, asbestos, wollastonite, whiskers, carbon filaments, talc, kaolin and other clays, mica, calcium carbonate, fly ash, and ceramics. Filamentous fillers such as glass fibers typically provide the greatest impact and tensile strength properties while the addition of more platy structures like talc and mica typically result in increased stiffness and heat distortion. A single filler or multiple fillers may be used depending upon the desired properties. Glass fibers are in particular commonly used as a reinforcing filler in composites because it is known that the glass fiber will generally improve stiffness without significantly reducing impact properties or increasing density. However, glass fibers are typically the most cost prohibitive reinforcing filler and additionally result in significant wear to processing equipment. As a result, less expensive fillers, such as talc and mica, have been used to replace either part or all of the glass fibers in a composite. Unfortunately, these fillers usually have a much higher density which has heretofore resulted in heavier composites article than those employing glass fibers. It would be beneficial if composites containing these or other inorganic fillers rather than or as a substitution for a significant portion of glass fiber could be devised that did not have the density concerns previously indicated.

In addition to the above described components, composites may contain other additives depending upon the intended use of the article. Compatibilizers are often use to effectuate the mixing (i.e., compatibility) of two or more polymers which might comprise the source of polymer used in the composite. These compatibilizers will typically have reactive groups that upon heating and shearing will react with the polymers via free radical or ionic mechanisms. Compatibilizers which have been employed include the various maleic anhydride copolymers and ionomers, acrylate copolymers, and ethylene acrylic acid copolymers. The composite may additionally contain antioxidants, UV stabilizers, lubricants, antifungal agents, and colorants. These various additives may be added during fabrication of the construction article or may be present in one of the initial polymeric components.

SUMMARY OF THE INVENTION

In accordance with one aspect of the invention, there is provided a polymeric composite comprising a polymer component comprising polyolefins; a rubbery polymeric component comprising particles of which about 90% by weight will not pass through a 100 mesh screen; and a reinforcing filler component comprising mica. When expanded mica is used it allows for a reduction in density over similar composites containing traditional mica. The polyolefins of the polymer component are preferably waste or recycled polyolefins. The rubbery polymeric component is preferably crumbed tire fragments.

The polymeric composite contains between about 40% and about 75% of the polymer component. This polymer component is thermoplastic in nature and preferably contains polyolefins as a primary ingredient. The composite further contains between about 4% and about 40% of the rubbery polymeric component and between about 6% and about 50% of the reinforcing filler component.

In accordance with another aspect of the invention, there is provided an article of construction formed of a polymeric composite comprising a polymer component comprising polyolefins; a rubbery polymeric component comprising particles of which about 90% by weight will not pass through a 100 mesh screen; and a reinforcing filler component comprising mica. The article of construction has a foamed inner core that is obtained by the evaporation of volatile compounds contained within the composite. The primary source of these volatile compounds are hydrocarbons and moisture initially contained within the rubbery polymeric component of the composite. This method of achieving a foamed core is in contrast to the use of conventional foaming agents such as the combination of an alkali metal bicarbonate and a bicarbonate salt of a saturated fatty acid. Additionally, the foamed inner core of the article of construction is more homogeneously distributed than foamed inner cores obtained from traditional foaming agents.

In accordance with another aspect of the invention, there is provided a process for forming an article of construction, wherein the article of construction is formed of a polymeric composite comprising a polymer component comprising polyolefins; a rubbery polymeric component comprising particles of which about 90% by weight will not pass through a 100 mesh screen; and a reinforcing filler component comprising mica wherein the article of construction has a foamed inner core that is obtained by the evaporation of volatile compounds contained within the composite and wherein the process is selected from the group consisting of extrusion and molding processes.

BRIEF DESCRIPTION OF THE DRAWINGS

The foregoing and other advantages of the invention will become apparent upon reading the following detailed description and upon reference to the drawings in which.

Figure 1:
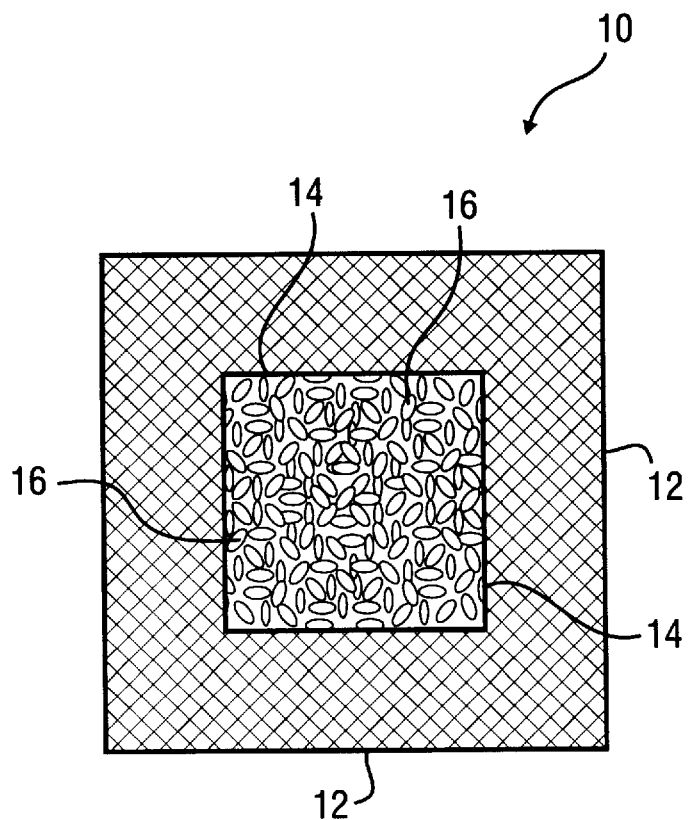
FIG. 1 is a cross section of an article of construction formed of a composition of the invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF SPECIFIC EMBODIMENTS

In one embodiment there is provided composites useful as construction materials. The construction materials prepared from the composites of the embodiment can be used in place of similar materials constructed from wood, concrete, or other traditional materials. The cross-section of an illustrative article of construction 10 is depicted in FIG. 1. When formed, the construction materials 10 have a substantially solid outer surface 12 and a foamed core 14 that is obtained substantially or wholly without the aid of traditional foaming agents. The polymeric composites contain the following ingredients:

a) a polymer component;

b) a rubbery polymeric component comprising particles of which about 90% by weight will not pass through a 100 mesh screen; and c) a reinforcing filler component.

The polymer component is preferably a polyolefin and additionally it is preferably obtained as recycled or waste material to be distinguished from virgin polymer. Recycled or waste polymer comes from a variety of sources. The polymer may be post consumer obtained from thin walled containers or flexible packaging. It may be obtained from commercial sources such as offgrade material from production facilities or trim waste from film fabrication processes. There are numerous other sources of waste or recycled polymer.

The waste or recycled polyolefins which are preferably utilized as the polymer component to produce the composites of this embodiment includes HPDPE, LDPE, LLDPE, other polyethylenes, polypropylene including both homopolymer and copolymer variations, and combinations of these polymers.

The waste or recycle polyolefin may as previously indicated additionally contain minor amounts, typically less than about 20%, of various other polymers including polyvinyl chloride (PVC); chlorinated polyethylene (CPE); chlorosulfonated polyethylene; various compounded polymers; styrenic polymers; and various engineering thermoplastics such as polyamides, polycarbonates, thermoplastic polyesters, and ABS.

The rubbery polymeric component is preferably obtained from tires. The tires are most economical when they are reclaimed after their initial use. The tires are preferably in a crumbed state which has been obtained by known cutting, grinding and shredding methods that may be ambient or cryogenic in nature. The rubbery polymeric component adds impact strength and flexibility to the composites of the embodiment. Additionally, the crumbed rubber results in improvements in the nail or spike retention characteristics of railroad ties formed of the composite. Convenient sources of disposed tires will in addition to the rubbery polymeric material typically contain steel and polyester (or other strands or fibers). For the purposes of this embodiment, the steel is substantially removed prior to use, but the polyester present in the tires need not be removed. The crumbed tire fragments may contain some steel shreds, but a substantial presence of steel will normally result in significant wear on processing equipment. The rubbery polymeric component may alternatively or additionally contain other rubbery materials including natural rubber, EPDM, styrene butadiene rubber, and styrene butadiene styrene rubber.

A unique feature of the composite of the present embodiment is that articles of construction or construction materials formed from the composite have a foamed core 14 that is obtained without traditional foaming agents or optionally with a substantial reduction in the quantity of traditional foaming agents. The existence of voids 16 in the polymer matrix core 14 allows for a reduction in the overall density of the fabricated construction article. The weight of an article of a given size and shape is reduced and the strength to weight ratio for the article increases. The voids 16 that constitute the foamed core 14 are formed when volatile compounds are released from different components of the composite during the fabrication of the construction material. The cellular foamed core 14 of a representative article of construction of the embodiment is depicted in FIG. 1. The primary source of these volatiles is the rubbery polymeric component. Crumbed tire fragments are in particular good sources of these volatile compounds. Upon heating to a sufficient temperature, that will vary with vapor pressure, volatile compounds within the crumbed tire fragments, primarily hydrocarbons and moisture, are released via evaporation and become the source of cell formation (i.e., voids or foaming) that is desirable for the property enhancements previously described. The density of the construction article is thus directly related to the degree of foaming that occurs during fabrication. Because the degree of foaming is directly related to the degree of evaporation of volatile compounds and the degree of evaporation of volatile compounds to the pressure and temperature maintained in the extruder or other mixer, it is necessary that the temperature and pressure of the molten composite be precisely controlled to achieve an article 10 having a foamed core 14 with a homogeneous or desired density profile.

The cell formation obtained in this manner is more homogeneous than cell formation obtained primarily by traditional foaming agents because the source of the volatile compounds producing the cells will generally constitute a significantly larger part of the composition than a traditional foaming agent. The rubbery polymeric component which is the primary source of the volatile compounds will at times comprise as much as about 40% of the composite while tradition blowing agents are typically employed at less than 2.0% of the total composition. Additionally, because traditional foaming agents are employed in such low quantities, it is difficult to achieve a homogeneous distribution of these traditional foaming agents whereas a homogeneous distribution of the rubbery component because of its higher usage level is more readily obtained.

The size of the tire fragments employed is an important consideration for the foaming process. The tire fragments should be crumbed rather than reduced to fine powders. Tire fragments that have been reduced to a fine powder will typically, because of the fine grinding and drying, not contain the volatile constituent compounds necessary for foaming. Crumbed tire fragments as previously indicated may be obtained by any number of operations, such as cutting, grinding and shredding methods that may be ambient or cryogenic in nature. However, to increase the likelihood of the release of the necessary quantity of volatile compounds, about 90% by weight of the crumbed tire fragments, however obtained, should not fit through a 100 mesh screen. When other materials are used as the rubbery polymeric component, they to should not be in a powdery state or otherwise reduced in size to such a degree as to remove a significant portion of any volatile compounds.

In variations of this embodiment, the composite may additionally contain some quantity of a traditional foaming agent such as those previously described. However, their use in addition to the volatile compound method of cell formation described has not lead to significant further reductions in composite density.

The reinforcing filler component contains primarily mica. When traditional mica is incorporated into polymeric composites used in construction materials the resulting article typically has a specific gravity or density that is often prohibitively too high for many applications. Expanded mica, conversely, can be used to obtain composite articles that have lower and more acceptable densities. This unique characteristic is due to the fact that upon exposure to high temperatures the mica particle will physically expand to occupy a greater space (i.e., a greater volume). Expanded versions of mica can be obtained from several sources such as under the tradename Vermiculite. Thus a given mass of expanded mica will occupy a greater volume than the same mass of traditional mica. For example, when expanded mica is incorporated into a composite article of the embodiment at levels ranging from about 10% to about 30%, a reduction in density ranging from about 5% to about 15% can be obtained over a composite containing the same level of traditional mica. An increase in bending strength ranging from about 20% to about 30% was additionally observed for the composites containing the expanded mica.

Glass fiber or other fibrous reinforcing fillers may, depending upon the desired properties, additionally comprise some percentage of the reinforcing filler component. However, as previously indicated, the addition of glass fibers under current economics will result in higher raw material costs. As an alternative, the fibrous components of tires, employed as the rubbery polymeric component, may provide some of the same effects as the more cost prohibitive glass fiber. Indeed, additional polyester fiber reclaimed from tires can be added as a separate source of reinforcing fiber.

The composite may contain other fillers as well, including traditional mica. Although the inclusion of fillers having a density greater than expanded mica will partially defeat any goal of weight reduction obtained with the expanded mica, there may be instances where an increase in density is desirable.

The composite may optionally contain other components depending upon the intended use of the construction article. Although the polymer component, even when obtained as waste or recycle, and the rubbery polymeric component typically will contain antioxidants to minimize the thermal degradation of the polymer during use, additional antioxidants may be added to the composite. UV stabilizers may additionally be present in an initial component or added during the fabrication of the construction article presently of concern. Other additives, including compatibilizers, lubricants, antifungal agents, and colorants may additionally be present.

The polymeric composite of the embodiment contains between about 40% and about 75% of the polymer component. This polymer component is thermoplastic in nature and preferably contains polyolefins as its primary ingredient. The composite further contains between about 4% and about 40% of the rubbery polymeric component and between about 6% and about 50% of the reinforcing filler component. The composite may in further embodiments contain other additives, such as traditional blowing agents, compatibilizers, colorants, and lubricants, in an amount between about 0% and about 6%. In variations of the embodiment in which both expanded mica and glass fiber are employed as ingredients in the reinforcing filler component, the composite may contain between about 6% and about 35% expanded mica and between about 0% and about 25% glass fiber. In other embodiments, traditional mica may be used in conjunction with or as a replacement for expanded mica.

In other embodiments a quantity of styrenic polymer may be incorporated into the composite that is in addition to any styrenic polymer that might have been contained within waste or recycled polymer used as the polymer component. As known in the art, the addition of styrenic polymer to polyolefins normally leads to increases in stiffness in a fabricated article. When the styrenic polymer is incorporated in this manner it is employed in amounts ranging from about 0% to about 12%.

In another embodiment, methods are provided for forming the composite of the previous embodiment into a construction article of a desired shape. As previously indicated, previously known composite materials have been used to replace traditional wood, concrete, and other materials in numerous articles of construction, including railroad ties. It is expected that the composites of the prior embodiment can be similarly utilized. As such, any of the polymer processing and fabrication methods known in the art for producing construction materials can be utilized to produce articles of construction formed of the composite of the prior embodiment. These methods would include both extrusion and molding processes such as injection and compression molding. Extrusion processes are preferred.

Figure 2:
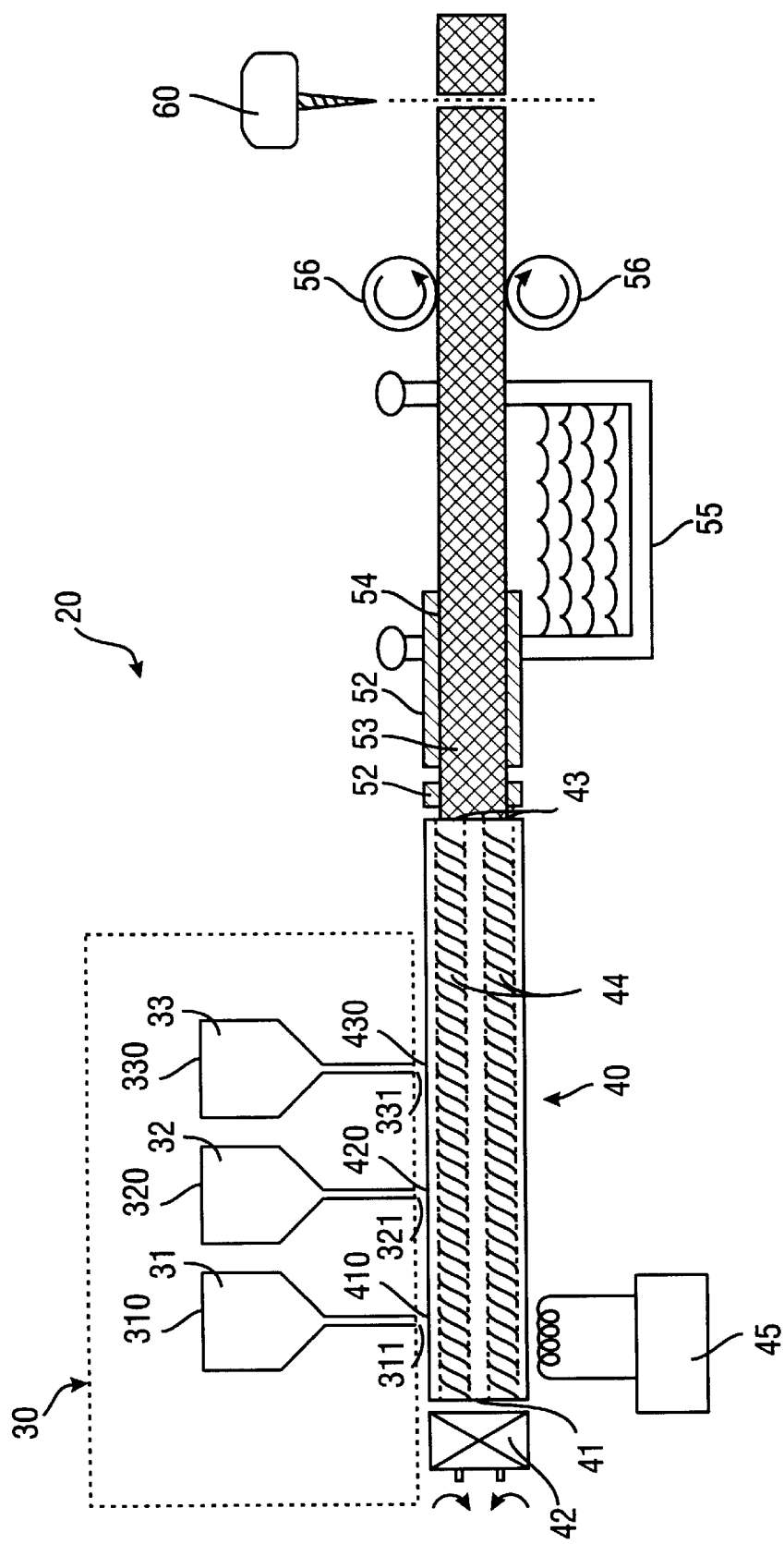
FIG. 2 is a depiction of an extrusion apparatus which can be utilized to form articles of construction from the compositions of the invention.

In another embodiment the construction article is formed from the composite in an extrusion process depicted in FIG. 2. The extruder apparatus 20 includes a feeding section 30, a heating and mixing section 40, and a shaping section 50.

The feeding section includes a first feeder 31 having an input end 310 and an output end 311, a second feeder 32 having an input end 320 and an output end 321, and a third feeder 33 having an input end 330 and an output end 331. The polymer component preferably selected from polyolefins and even more preferably selected from waste or recycled polyolefins is provided to the input end 310 of the first feeder 31. The rubbery polymeric component, preferably containing tire fragments that are preferably crumbed to a desired size, is provided to the input end 320 of the second feeder 32. The reinforcing filler component containing mica is provided to the input end 330 of the third feeder 33. The use of expanded mica as some/portion of the reinforcing filler component is preferred. In another embodiment, the reinforcing filler component may additionally contain glass fiber. In still another embodiment, other additives may be provided to the input end 330 of the third feeder 33. In yet still another embodiment, a portion of the reinforcing filler component or other additives may be provided to the input end 320 of the second feeder 32.

The heating and mixing section 40 has a drive end 41 attached to a rotational device 42 which is preferably a motor and an outlet end 43. Disposed between the drive end 41 and output end 43 is at least one screw 44 having flights which convey material toward the output end 43 of the mixing section 40. In a preferred embodiment, the extrusion apparatus 20 is a twin screw extruder having two screws 44. This is the configuration depicted in FIG. 2. Material in the feeders 31,32, and 33 are provided to the mixing and heating section 40 from output ends 311, 321, and 331 to input ports 410, 420, and 430. In a preferred embodiment, input port 420 is from about 10 to about 12 screw diameters downstream from input port 410 and input port 430 is about 18 screw diameters downstream form input port 420.

Heat is applied to the heating and mixing section 40 and is controlled via controller 45. The rotational device 42 rotates the screws 44 which convey the material toward the output end 43. The conveyance of the material results in the mixing of the components and the liberation of additional heat due to friction.

Volatiles given off during the mixing and conveyance in the mixing and heating section 40 are liberated at the outlet end 43. The composite emerging from the outlet end 43 of the mixing and heating section 40 is pressed through an orifice 51. The pressure developed at the orifice 51 will typically range from about 200 to about 1000 psi. The composite emerges from the orifice into a forming die set 52 which comprises a heated die section 53 which is attached to the orifice 51 and a cooled die section 54 which is adjacent to a cooling bath 55. A pulling device 56 is positioned after the cooling bath to effectuate the removal of the finished article from the extruder apparatus 20. The walls of the die set 52 define the shape of the finished article. For example, if a railroad tie is desired the walls of the die set will constitute a generally although not perfectly rectangular shape that will typically be about 7 inches by about 9 inches. The shape of a die used to produce a rectangular article will generally deviate from a true rectangle by having at least two convex sides. It should be readily evident that the capacity of the extruder apparatus 20 should be sufficient to provide a quantity of composite sufficient to fill the entire area of the die set 52.

The composite emerges from the cooled die section 54 of the die set 52 in the shape of the desired article of construction and then passes into the cooling bath 55. After cooling, the outer surface of the article is substantially continuous whereas the core of the article is characterized by a foamed cell structure. The cooling bath 55 causes the outer surface of the article to solidify. The outer surface must be substantially solid in order to prevent deformation from the pulling device 56. Additionally, the speed of pulling device 56 must be maintained in balance with the extrusion rate of the extrusion apparatus 20 to minimize deformation. One way of accomplishing this, is to monitor the expansion pressure of the composite exiting the outlet end 43 of the extruder apparatus 20. This can be accomplished for example by monitoring the pressure exerted by the composite article against the walls of the die set 52. The speed at which the pulling device 56 pulls on the composite article can then be varied depending on changes in this monitored pressure (i.e., increased pull speed when an increase in pressure above a desired range is detected and decreased pull speed when a decrease in pressure below a desired range is detected). By varying the takeoff or pull speed in this manner, a more homogeneous composite article with reduced deformation and reduced stress localization can be formed.

The finished article emerging from the extrusion apparatus 20 and pulling device 56 can be cut to the desired length by a power saw 60 or other cutting means, such as a hot wire, that can be optionally positioned after the pulling device 56.

EXAMPLES

Four polymeric composites (A-D) were prepared by dry feeding individual raw materials via calibrated screw feeders to various feed ports on a Werner & Fleiderer twin screw extruder. In addition to feed location, revolutions per minute (rpm), amperage, and temperature profiles were controlled to accomplish mixing, melting, melt mixing, and compression.

Extrudate emerging from the extruder was forced through a compound shaping die set equipped with internal cooling to achieve a nominal cross-sectional profile of 7 inches by 9 inches. The solid profiles were drawn from the shaping die set and through a cooling water bath by a controllable, mechanical puller. The profiles were cut in to approximately 9 foot sections and were allowed to cool further.

The physical properties of the formed articles were determined at the Wood Sciences Laboratory in the Department of Natural Resources and Environmental Sciences at the University of Illinois. The lab, under the direction of Professor Chow, does extensive testing for the United States railroad industry and has developed specific apparatus to handle the testing of full size crossties. The tests performed are the functional equivalent of ASTM standards for hardness, stiffness, compression strength, and break strength. Additional special purpose tests have been designed and are performed to determine spike push, spike pull, and spike lateral resistance.

Each article was tested for stiffness and breakage by suspending a 9 foot specimen on 60 inch supports and applying a center load by a mechanical press. Stress-strain or load-deflection curves were generated automatically until the article exceeded its elastic limit and failed.

The same mechanical press was adapted to determine the spike push (spike insertion resistance), spike pull (spike withdrawal resistance), and spike lateral resistance.

The composition, processing conditions, and physical properties of the four composites are given in the following tables.

Composition of Polymeric Composites

| Component (lbs/composite) | A | B | C | D |
| --- | --- | --- | --- | --- |
| Recycled Polyolefin | 393 | 393 | 390 | 390 |
| Rubber | 75 | 75 | 103 | 103 |
| Mica | 85 | 85 | 75 | 75 |
| Glass Fiber | 85 | 85 | 75 | 75 |
| Other Additives | 10 | 10 | 10 | 10 |

For this Example Mica is substantially traditional mica.

Processing Conditions

| Process Condition | A | B | C | D |
| --- | --- | --- | --- | --- |
| RPM | 140 | 140 | 105 | 105 |
| Amperage (amps) | 150 | 150 | 220 | 220 |
| Extrusion Temperature Range (°F.) | 140–366 | 140–366 | 151–398 | 151–398 |

Physical Properties

| Physical Property | A | B | C | D |
| --- | --- | --- | --- | --- |
| Length (inch) | 109.5 | 109.5 | 109.0 | 109.5 |
| Width (inch) | 8.69 | 8.75 | 8.63 | 8.69 |
| Thickness (inch) | 6.94 | 6.88 | 7.00 | 7.00 |
| Load at 0.2" deflection lbs | 1680 | 1440 | 1440 | 1560 |
| Maximum Load (lbs) | 5661 | 6457 | 5885 | 5388 |
| Modulus of Elasticity (psi) | 164400 | 144000 | 144000 | 153000 |
| Modulus of Rupture (psi) | 1220 | 1410 | 1310 | 1140 |

0.2" was the approximate elastic limit for the composites.

Selective Spike Properties

| Composite | Spike Push (lbs) | Spike Pull (lbs) | Lateral Resistance (lbs) | Compressive Modulus of Elasticity (psi) | Face Hardness (lbs) |
| --- | --- | --- | --- | --- | --- |
| B(face) | 3651 | 1030 | 2710 | 12650 | 3508 |
| B(back) | 4690 | 2400 | n/a | 15120 | 5403 |
| B(side) | 3267 | n/a | n/a | n/a | n/a |
| C(face) | 4059 | 1701 | 2952 | 16250 | 5242 |
| C(back) | 3686 | 1317 | 2264 | 13240 | 3708 |
| C(side) | 3854 | n/a | n/a | n/a | n/a |

The term "n/a" indicates that a measurement for a property was not available.

What is claimed is:

1. A polymeric composite comprising:
   a thermoplastic polymer component comprising a polyolefin, copolymers thereof, or combinations thereof;
   a rubbery polymeric component comprising particles of which about 90% by weight will not pass through a 100 mesh screen; and
   a reinforcing filler component comprising mica
   wherein the polymer component comprises from about 40% to about 75% of the polymeric composite, the rubbery polymeric component comprises from about 4% to about 40% of the polymeric composite, and the reinforcing filler component comprises from about 6% to about 50% of the polymeric composite.

2. The polymeric composite of claim 1, wherein the polyolefins are waste or recycled polyolefins.

3. The polymeric composite of claim 1, wherein the polyolefins are selected from the group consisting of HDPE, LDPE, LLDPE, propylene homopolymer, propylene-ethylene copolymer, and combinations of these polymers.

4. The polymeric composite of claim 1, wherein the rubbery polymeric component comprises crumbed tire fragments.

5. The polymeric composite of claim 1, wherein the reinforcing filler component comprises expanded mica.

6. The polymeric composite of claim 1, wherein the reinforcing filler component additionally comprises glass fiber.

7. The polymeric composite of claim 1, further comprising a styrenic polymer component.

8. The polymeric composite of claim 1, wherein the composite is a rigid structural member.

9. A article of construction formed of a polymeric composite comprising:
   a polymer component comprising a polyolefin, copolymers thereof, or combinations thereof;
   a rubbery polymeric component comprising particles of which about 90% by weight will not pass through a 100 mesh screen; and
   a reinforcing filler component comprising mica
wherein the article of construction has a foamed inner core.

10. The article of construction of claim 9, further comprises a substantially non-porous outer surface.

11. The article of construction of claim 9 comprised of from about 40% to about 75% of the polymer component, from about 4% to about 40% of the rubbery polymeric component, and from about 6% to about 50% of the reinforcing filler component.

12. The article of construction of claim 9, wherein the polyolefins are waste or recycled polyolefins.

13. The article of construction of claim 9, wherein the rubbery polymeric component comprises crumbed tire fragments.

14. The article of construction of claim 9, wherein the reinforcing filler component comprises expanded mica.

15. The article of construction of claim 9, wherein the reinforcing filler component additionally comprises glass fiber.

16. The article of construction of claim 9, further comprising a styrenic polymer component.

17. The article of construction of claim 9, wherein the article of construction is a railroad tie.

18. A polymeric composite comprising:
   a polymer component comprising a polyolefin, copolymers thereof, or combinations thereof;
   a rubbery polymeric component comprising particles of which about 90% by weight will not pass through a 100 mesh screen; and
   a reinforcing filler component comprising expanded mica.

19. A polymeric composite comprising:
   a polymer component comprising a polyolefin, copolymers thereof, or combinations thereof;
   a rubbery polymeric component comprising particles of which about 90% by weight will not pass through a 100 mesh screen;
   a reinforcing filler component comprising mica; and
   a styrenic polymer component.

* * * * *